United States Patent [19]

Cusack

[11] Patent Number: 5,068,975
[45] Date of Patent: Dec. 3, 1991

[54] PRECISION PARALLEL MECHANICAL FLOAT

[75] Inventor: Robert F. Cusack, Grosse Pointe Park, Mich.

[73] Assignee: GTE Valenite, Troy, Mich.

[21] Appl. No.: 624,502

[22] Filed: Dec. 7, 1990

Related U.S. Application Data

[60] Continuation of Ser. No. 269,047, Nov. 9, 1988, abandoned, which is a division of Ser. No. 941,679, Dec. 15, 1986, Pat. No. 4,803,786.

[51] Int. Cl.$^5$ ................................................. G01B 5/25
[52] U.S. Cl. ......................................... 33/644; 33/520
[58] Field of Search ................. 33/644, 559, 561, 520, 33/572, 832, 833; 414/729, 730; 901/45

[56] References Cited

U.S. PATENT DOCUMENTS

| | | | |
|---|---|---|---|
| 4,098,001 | 7/1978 | Watson | 33/169 |
| 4,276,697 | 7/1981 | Drake et al. | 33/169 |
| 4,283,153 | 8/1981 | Brendamour | 403/53 |
| 4,414,750 | 11/1983 | De Fazio | 33/185 |
| 4,627,169 | 12/1986 | Zafred et al. | 33/169 |

FOREIGN PATENT DOCUMENTS 1215936  3/1986  U.S.S.R. ................................ 901/45

OTHER PUBLICATIONS

The ASTEK Series GTP-45 Gripper Floating Holder–Diatest.
Accommodator Model AST-100 Lord Industrial Products (RCC Remote).

Primary Examiner—Allan N. Shoap
Assistant Examiner—Alvin Wirthlin
Attorney, Agent, or Firm—Bill C. Panagos; Robert Walter

[57] ABSTRACT

Precision parallel mechanical float for compliance automation gaging, parts handling assembly and other operations involving a combination of tolerance misalignment. Parallel plates separated by three precision resiliently preloaded flat end rods provide resilient yield in a parallel plane as well as tilting under predetermined loading together with automatic recentering through restoring spring bias.

4 Claims, 4 Drawing Sheets

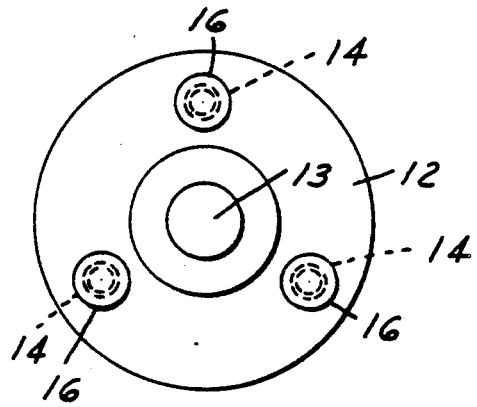
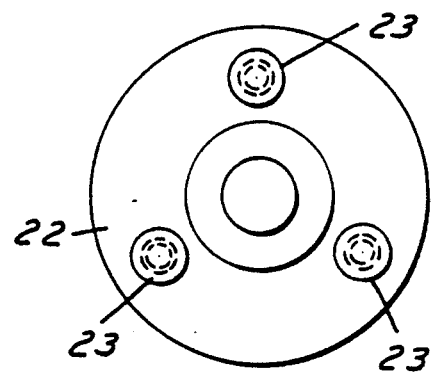
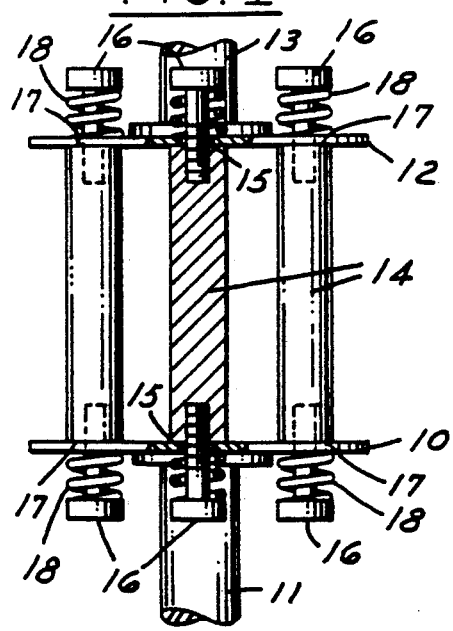
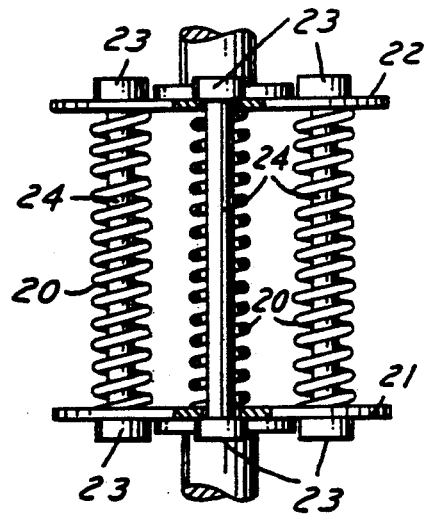

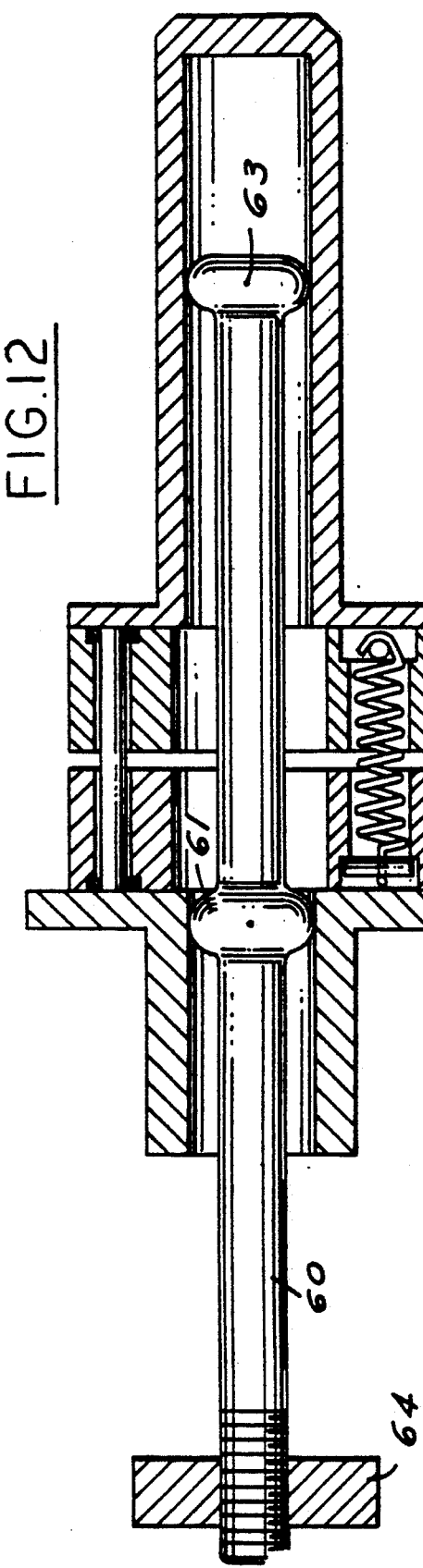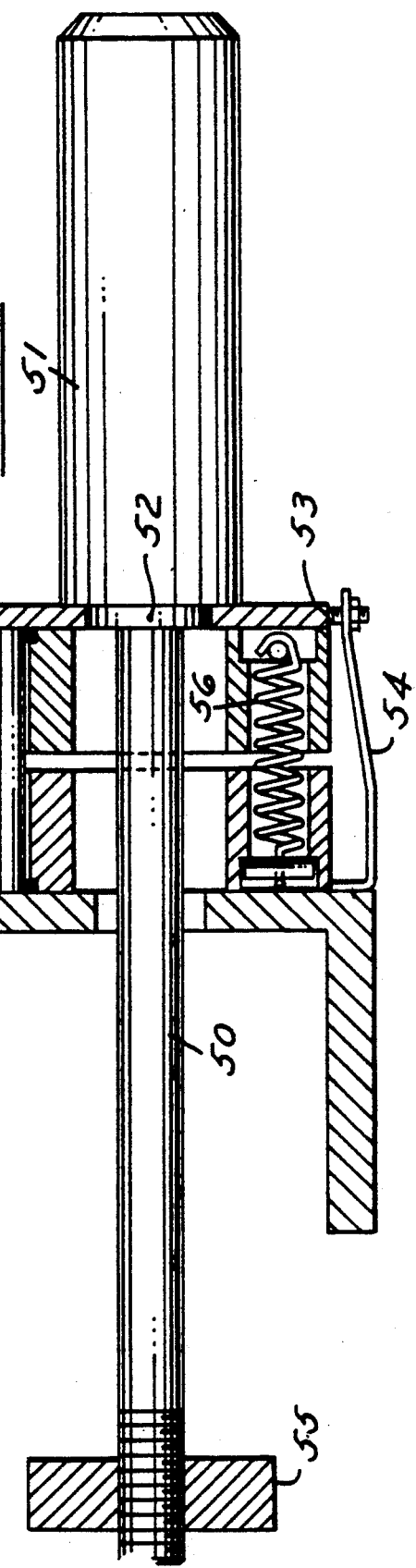

PRECISION PARALLEL MECHANICAL FLOAT

This is a continuation of U.S. Ser. No. 07/269,047 filed 11/9/88 now abandoned which is a divisional of U.S. Ser. No. 06/941,679, filed on Dec. 15, 1986, U.S. Pat. No. 4,803,786.

BACKGROUND OF THE INVENTION

In automatic gaging, assembly and parts handling operations where misalignment arising from tolerance variations involves a requirement for compliance or float between the tool and its fixed or programmable mounting, various approaches have been made in the prior art. For example, parallel plates in the form of a thrust bearing with ball carrier and coil spring return have been commercially sold under the trade name "Diatest". The "Aztec Accommodator" provides multi-axis compliance or float for automatic assembly machines using a set of six elastomeric shear pads which compensate for machine and tool misalignment as well as part to part variation. A remote center compliance device "R C C Device" provides flexibility accomplished with laminated elastomer and metal shim elements which are stiffer in compression than in shear. Such prior art devices may not have a reliable accurate home or rest position and may tend to tilt rather than shift laterally in precision parallel relationship.

SUMMARY OF THE PRESENT INVENTION

Precision parallel mechanical float is accomplished in the present invention through employment of three or more rods extending between a base and movable member with piloted fasteners and bias springs permitting parallel lateral float and reliable return to home or rest position. The base and movable member have essentially flat ground surface plates that are engaged by three parallel equally spaced rods which are equal in length and have their ends ground flat and perpendicular with respect to their cylindrical axis.

In one embodiment, the rods are equipped with female threads at each end to facilitate the engagement of headed fasteners extending through both plates which are held by compression springs in a manner which pilots and loads the base and movable member on the three rods. This pilot action enables the rods to tilt and yet remain equally spaced when a lateral force sufficient to overcome the neutral home position spring force is encountered by the movable member. It moves in the direction of the force, but remains parallel to the base. The removal of the lateral force permits the member to return under spring bias to its neutral home position. The movable member can also tilt if sufficient bending force about the central axis is encountered. Such tilt is limited by the compressed height of the bias springs and free length of the piloted fasteners.

In a second embodiment, the base and movable member are urged apart by integral bias springs onto parallel end caps on the support rods. This embodiment permits over-travel and tilt toward the base and rigid engagement at the limits of the end caps away from the base, as compared to the first embodiment which provides rigid engagement toward the base, and over-travel tilt away from the base.

Both embodiments provide preferred lateral parallel movement with precision rest or home position within a predictable range of translation forces. Predeterminable translation versus tilt characteristics are available to the designer to achieve optimization of inherent properties.

In a third embodiment, equally spaced rods with square ends are piloted within housings extending between end plates with intermediate circumferentially spaced extension springs creating a bias loading of the end plates against the rod ends.

In order to provide float head compensation for nonvertical use where gravity-induced tilt and sag forces are encountered, the gravity weight of the gage or other tooling extending from the movable plate may be balanced by a vertical bias spring anchored to the base and supporting the weight of the movable plate with tooling. Counterbalanced embodiments neutralize gravity for any fixed or changing position of the base.

BRIEF DESCRIPTION OF THE DRAWINGS

FIG. 1 is a partially sectioned side elevation of a first embodiment;

FIG. 2 is a plan view of the FIG. 1 embodiment;

FIG. 3 is a partially sectioned side elevation of a second embodiment;

FIG. 4 is a plan view of the FIG. 3 embodiment;

FIG. 11 is a sectional side elevation of a fifth embodiment similar to that of FIG. 9 illustrating a counterbalance for the cantilever load on the movable member;

FIG. 12 is a sectional side elevation of a sixth embodiment similar to that of FIG. 11 illustrating a different system for counterbalancing the movable member;

DETAILED DESCRIPTION OF FIRST EMBODIMENT

Figure 5:
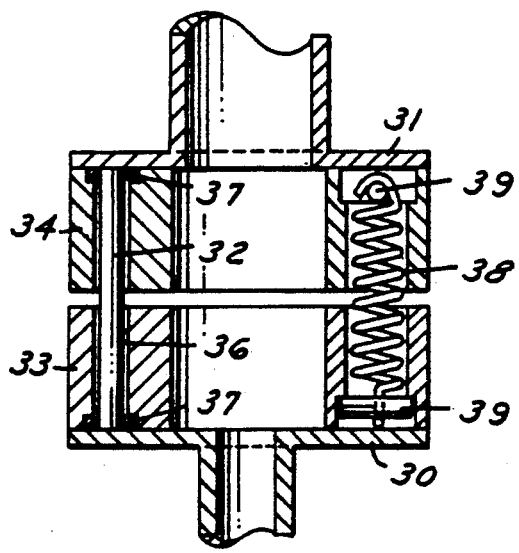
FIG. 5 is a sectional side elevation of a third embodiment.

With reference to FIGS. 1 and 2, base plate 10 supported on any suitable mounting 11 in turn supports movable plate 12 with gage mount 13 or other tooling secured on three columnar rods 14 equally circumferentially spaced as shown in FIG. 2. Clearance apertures 15 in plates 10 and 12 for cap screws 16 threaded into rod ends 17 retain compression springs 18 biasing plates 10 and 12 against rod ends 17 which are precision ground to equal length and squareness to establish precise parallellism between plates 10 and 12.

Figure 8:
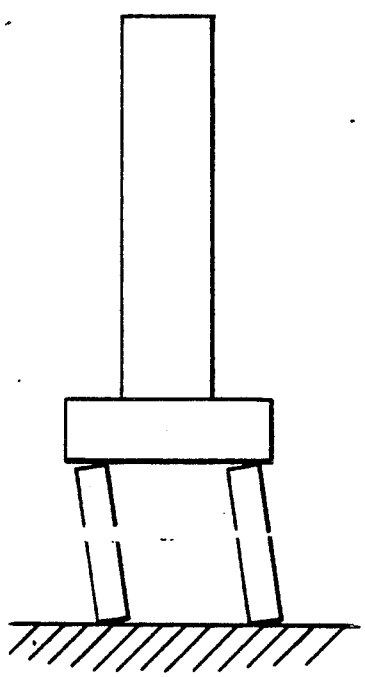
FIG. 8 is a view similar to FIG. 7 showing the movable member in displaced position.

Any lateral force on movable plate 12 sufficient to overcome the combined preload of the six compression springs will cause a tilting of the rods, as schematically illustrated in FIG. 8, accommodated within the limited clearance of apertures 15. Torque compliance as well as tilting compliance and extension compliance is also accommodated by this configuration while compressive compliance of plates 10 and 12 toward each other is resisted by the rods.

With reference to FIGS. 3 and 4, preloaded compression springs 20 bias plates 21 and 22 into engagement with heads 23 of rods 24, in this case accommodating parallel lateral float, torque, tilting and compressive compliance while resisting extension between plates 21 and 22.

Figure 6:
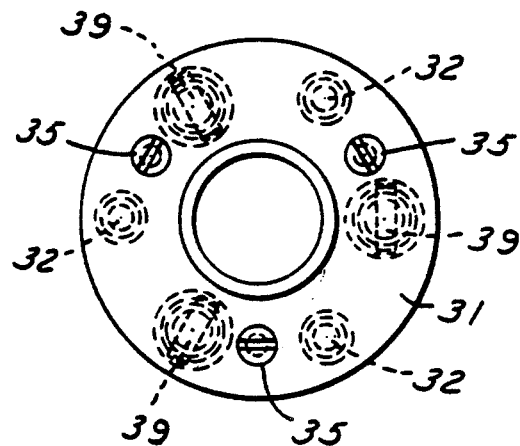
FIG. 6 is a plan view of the FIG. 5 embodiment.

With reference to FIGS. 5 and 6, base plate 30 is separated from movable plate 31 by three circumferentially spaced rods 32 passing through base guide body 33 and upper guide body 34 secured to respective plates 30 and 31 by intermediate screws 35. Rod passages 36 within the guide body limit relative lateral float while "O" rings 37 in counterbored pockets at either end assure accurate return to a central home position upon release of any lateral load under the bias of three tension springs 38 spaced circumferentially between the three rods 32. Cross pins 39 in respective counterbores at the ends of spring passages through bodies 33 and 34 serve to anchor the ends of extension springs 38 which return and retain the operative gage assembly for which this embodiment is employed in its neutral position as shown.

Figure 9:
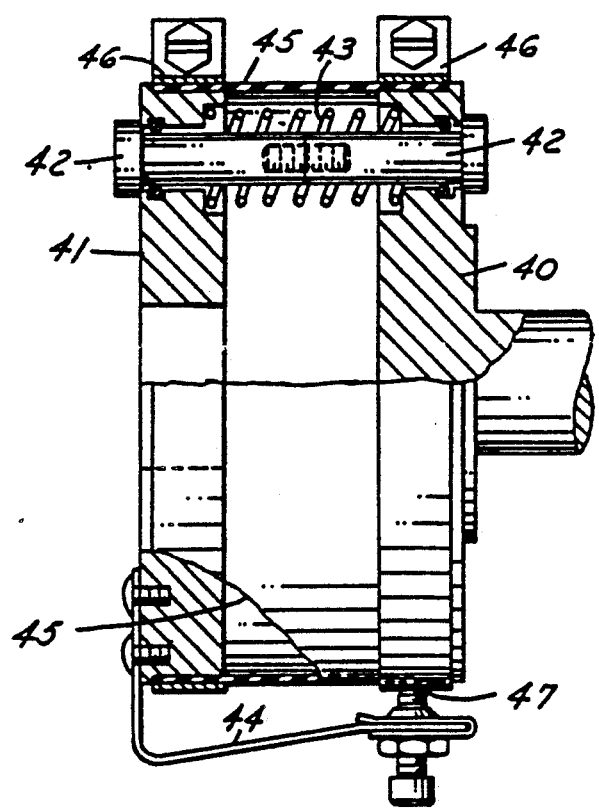
FIG. 9 is a partially sectioned side elevation of a fourth embodiment taken along the line 9—9 of FIG. 10, wherein the compliant rods extend in a horizontal direction.
Figure 10:
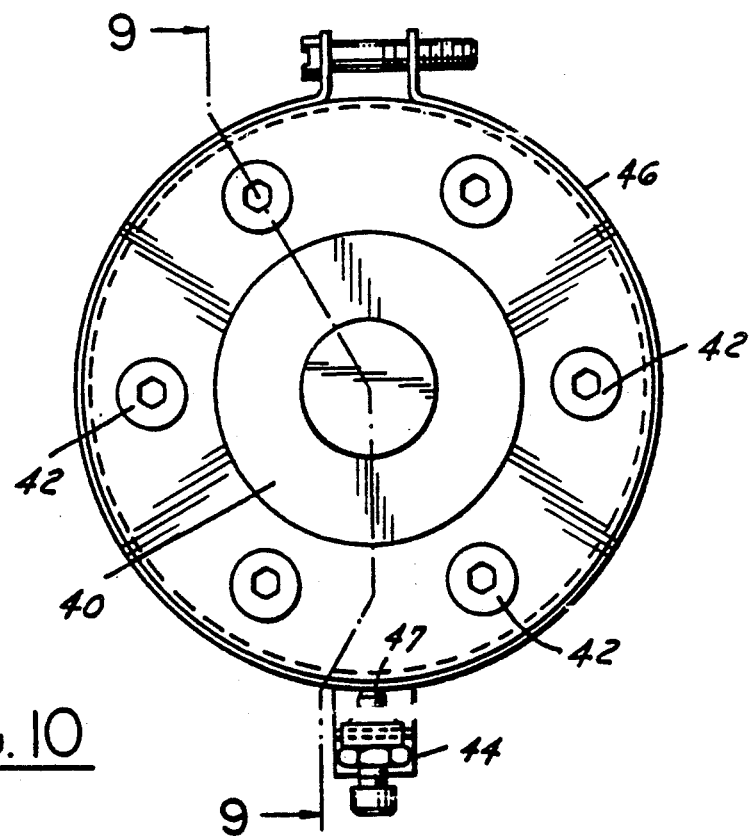
FIG. 10 is an end view of the embodiment shown in FIG. 9.

With reference to FIGS. 9 and 10, a means for supporting the gravity load of a floating mounting plate 40 from a base plate 41, having horizontal rods 42 biased in tension by compression springs 43, is provided by adjustable leaf spring 44 anchored at 45 to base plate 41. In this case, the three pairs of axially aligned rods are retained in centered alignment by screw 74 engaging threaded holes in the ends. Rubber boot 45 is clamped to respective plates 40 and 41 by strap clamps 46 as a dirt seal.

When a float head is used in nonvertical position, as in the case of the FIG. 9 embodiment, the gravity weight of the head, when its center is laterally displaced from support point 47, creates an unbalanced moment tending to tilt the head which necessitates relatively higher strength compression springs 43 than would otherwise be required to resist such tilting. In addition, an unequal force is required in upward deflection as compared to downward deflection since it would take more force to lift the gage tip than to force it down.

A solution for stationary nonvertical use is illustrated in FIG. 11 where the addition of a rearward projecting extension 50 under the movable member 51 shifts the center of gravity 52 to a position directly over contact 53 of vertical bias spring 54 which may be accurately adjusted by counterweight 55. This permits system float in all directions without preload tilting force and with biasing springs, in this case illustrated schematically as extension springs 56, of light strength equal to float springs employed with a vertical gage.

With reference to FIG. 12, a general solution to balance nonvertical applications of the float head in any orientation is illustrated wherein a central lever 60 is provided with a spherical fulcrum 61 seated in stationary member 62 and a spherical end 63 supporting the movable member at its center of gravity and is counterbalanced by adjustable weight 64 so that gravity forces will be compensated in all positions without the use of springs. Accordingly, only the effective restoring force from any displacement will be variable, and again the spring biasing forces for accommodating float may be calibrated to the desired requirements of the application.

In all embodiments, the ratio of rod diameter and length, together with spring preload determine basic resistance to lateral displacement while the effective spacing of rods together with spring preload determine the resistance to tilting forces which are offset from the movable plate engaged by the rods. It will be understood that desired respective values for accommodating the parallel float and tilting may be individually determined and adjusted by the design choice of the ratios of rod diameter to length and to rod separation; thus, resistance to parallel float may be reduced to any desired value by reduction in rod diameter without substantially changing resistance to tilt; while desired resistance to tilt may be increased through increasing spring preload for any given spacing of rods.

It will also be understood that for all embodiments, as long as tilt forces are resisted, any lateral shifting of the movable member will be accommodated with precision parallel relation and automatically restored to accurate neutral position upon release of displacement load, provision being made for retention of the rod ends in required orientation.

Figure 7:
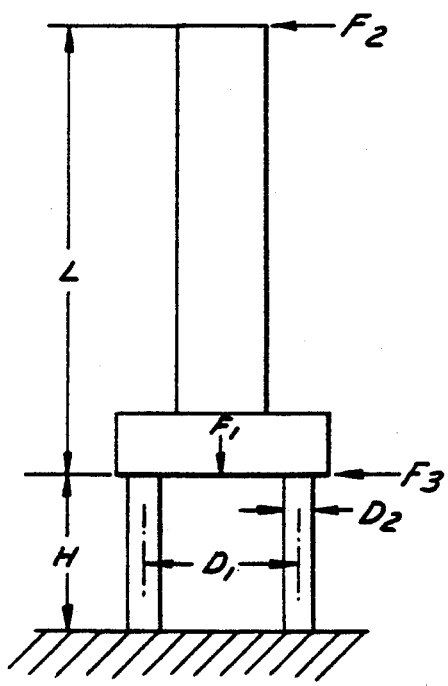
FIG. 7 is a schematic side elevation diagram of rods such as employed in the FIG. 1 and 5 embodiment in their home positions.

With reference to FIG. 7, spring loading plus gravity centered at $F_1$ will resist tilting force applied at $F_2$ until $F_2 \times L$ exceeds $F_1 \times (D_1^2)$; and will resist lateral force applied at $F_3$ until $F_3 \times H$ exceeds $F_1 \times D_2$. Likewise, torque will be resisted until equal and opposite forces applied at $D_1$ diameter each exceeds $F_1^2 \times D_2$. Resistance forces to $F_3$ and torque will diminish toward 0 as displacement, shown in FIG. 8, approaches $D_2$. Accordingly, displacement must be limited to a fraction of $D_2$ for a restoration force to be available.

The force diagram as applied to two columns in FIGS. 7 and 8 can similarly be applied to three or more column embodiments by making appropriate geometric allowances; e.g. effective radius of tilting relative to effective center of force $F_1$.

What is claimed is:

1. A precision parallel float mechanism comprising:
    (a) a base including three registration surfaces in a fixed plane of reference, each of said registration surfaces being spaced an equal distance from each of the remaining of the three registration surfaces;
    (b) a relatively displaceable member having three directly opposed corresponding registration surfaces lying in a plane of reference, said plane of reference being spaced from and substantially parallel to said fixed plane of reference;
    (c) three columns, each column having a pair of peripheral contact surfaces, each pair of contact surfaces being positioned at a respective opposite end of a respective column for engaging respectively a pair of said opposed registration surfaces, each of said columns including at least one reduced extension, each of said reduced extensions projecting through at least one of said opposed registration surfaces, a plurality of head extremities, each head extremity being positioned at the end of a respective reduced extension, and yieldable preloaded resilient means being positioned between each respective head extremity and each respective opposed registration surface, said yieldable preloaded resilient means establishing normal compression engagement with respective registration surfaces subject to each column tilting in substantially parallel relationship wherein the peripheral contact surfaces tilt with respect to the registration surfaces in response to a predetermined force couple imposed on the parallel planes of reference of said base and displaceable member, and said resilient means comprise compression springs reacting between respective head extremities and the base or displaceable member at the other end.

2. Mechanism of claim 1 wherein said columns comprise cylindrical rods and said resilient means comprise coiled springs.

3. Mechanism of claim 1 wherein said registration surfaces comprise equilaterally spaced areas of a planar surface.

4. Mechanism of claim 1 including means limiting displacement of said member relative to said base to less than the extension of said peripheral contact surfaces.

* * * * *